United States Patent
Yoshihara

(10) Patent No.: US 11,152,774 B2
(45) Date of Patent: Oct. 19, 2021

(54) ELECTRICAL JUNCTION BOX

(71) Applicant: Sumitomo Wiring Systems, Ltd., Mie (JP)

(72) Inventor: Hiroki Yoshihara, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 76 days.

(21) Appl. No.: 16/567,622

(22) Filed: Sep. 11, 2019

(65) Prior Publication Data
US 2020/0091695 A1 Mar. 19, 2020

(30) Foreign Application Priority Data
Sep. 14, 2018 (JP) ............................. JP2018-172751

(51) Int. Cl.
*H02G 3/16* (2006.01)
*B60R 16/023* (2006.01)
*H01R 13/52* (2006.01)

(52) U.S. Cl.
CPC ............ *H02G 3/16* (2013.01); *B60R 16/0239* (2013.01); *H01R 13/5202* (2013.01)

(58) Field of Classification Search
CPC ............ B60R 16/0239; H01R 13/5202; H01R 13/521; H02G 3/088; H02G 3/16
See application file for complete search history.

(56) References Cited

U.S. PATENT DOCUMENTS

| 5,967,808 A * | 10/1999 | Kubota | H01R 13/62911 439/157 |
| 2002/0061666 A1* | 5/2002 | Sato | H05K 7/026 439/76.2 |
| 2009/0117758 A1* | 5/2009 | Yamaguchi | H05K 7/026 439/76.2 |
| 2009/0247015 A1* | 10/2009 | Taniguchi | H01H 85/2035 439/620.33 |
| 2011/0094767 A1* | 4/2011 | Asao | H01R 13/6315 174/50 |
| 2011/0094793 A1* | 4/2011 | Asao | H02G 3/16 174/549 |
| 2011/0201216 A1* | 8/2011 | Miyamoto | H05K 1/18 439/76.2 |

(Continued)

FOREIGN PATENT DOCUMENTS

JP 2014-236621 A 12/2014

*Primary Examiner* — Timothy J Thompson
*Assistant Examiner* — Rhadames Alonzo Miller
(74) *Attorney, Agent, or Firm* — Honigman LLP

(57) ABSTRACT

In a connector of an electrical junction box, a protruding portion protrudes away from a tubular portion from a bottom wall of the tubular portion whose one end face is open. In a housing box, a tubular first cover portion protrudes outward from a circumferential edge portion of an insertion port, and a second cover portion protrudes from a portion of a front end face of the first cover portion. A portion of the protruding portion of the connector is inserted into the insertion port. The first cover portion covers the protruding portion, and the second cover portion covers the protruding portion with a space interposed between the second cover portion and the protruding portion 22. An adhering member is between the protruding portion of the connector and the first cover portion of the housing box and adheres to the protruding portion and the first cover portion.

7 Claims, 8 Drawing Sheets

(56) References Cited

U.S. PATENT DOCUMENTS

| | | | | |
|---|---|---|---|---|
| 2012/0085766 A1* | 4/2012 | I | .................... | H02G 3/088 |
| | | | | 220/378 |
| 2012/0327618 A1* | 12/2012 | Hara | ................ | H05K 7/02 |
| | | | | 361/752 |
| 2013/0017012 A1* | 1/2013 | Kawamura | .......... | H02G 3/0625 |
| | | | | 403/291 |
| 2013/0250489 A1* | 9/2013 | Toda | ................ | H02B 1/20 |
| | | | | 361/648 |
| 2013/0327566 A1* | 12/2013 | Makino | ............ | H02G 3/088 |
| | | | | 174/520 |
| 2015/0101862 A1* | 4/2015 | Shiraki | ............ | H02G 3/14 |
| | | | | 174/563 |
| 2015/0144395 A1* | 5/2015 | Tanaka | ............ | H01R 13/4367 |
| | | | | 174/668 |
| 2016/0006228 A1* | 1/2016 | Kawamura | ............ | H02G 3/081 |
| | | | | 361/657 |
| 2016/0013580 A1* | 1/2016 | Matsuda | ............ | H01R 13/5202 |
| | | | | 439/190 |
| 2017/0063069 A1* | 3/2017 | Kawada | ............ | H02G 3/081 |
| 2018/0100535 A1* | 4/2018 | Tashiro | ............ | B60R 11/00 |

\* cited by examiner

ELECTRICAL JUNCTION BOX

CROSS-REFERENCE TO RELATED APPLICATIONS

This application claims priority of Japanese Patent Application No. JP 2018-172751 filed on Sep. 14, 2018, the contents of which are incorporated herein.

TECHNICAL FIELD

The present disclosure relates to an electrical junction box.

BACKGROUND

Vehicles are often equipped with an electrical junction box that includes a housing box in which an electrical device is housed and connects a plurality of vehicle-mounted devices to each other via the electrical device housed in the housing box (see, for example, JP 2014-236621A). The housing box includes insertion ports into each of which a connector is inserted. Each vehicle-mounted device is detachably connected to one of the connectors. The electrical device is connected to the vehicle-mounted devices via the connectors. JP 2014-236621A discloses an electrical junction box in which, for example, power supplied from one vehicle-mounted device is supplied to other vehicle-mounted devices.

In the conventional electrical junction box disclosed in JP 2014-236621A, an adhering member is provided between the housing box and each connector, the adhering member adhering to the housing box and the connector, and the insertion port is hermetically sealed by the connector and the adhering member. With this configuration, water is prevented from entering the housing box via a gap between the housing box and the connector.

Vehicles are used to drive in various places, and thus the conventional electrical junction box mounted on vehicles may be exposed to saltwater. If saltwater accumulates in the space between the housing box, which is made of, for example, a metal such as aluminum, and the connectors, the metal corrodes, and a gap may be formed between the housing box and the connectors. If a gap is formed between the housing box and the connectors, water may enter the housing box via the gap and come into contact with the electrical device housed in the housing box, causing damage to the electrical device. The metal corrodes more easily as the amount of saltwater accumulating between the housing box and the connectors increases.

The present disclosure has been made in view of the circumstances described above, and it is an object of the present disclosure to provide an electrical junction box in which water is unlikely to accumulate in the space between a connector and a housing box.

SUMMARY

An electrical junction box according to one aspect of the present disclosure is an electrical junction box in which an electrical device can be housed and that can connect a plurality of external devices to each other via the electrical device housed therein, the electrical junction box including: a connector that includes a tubular portion whose one end face is open, and a protruding portion that protrudes from a bottom wall of the tubular portion away from the tubular portion; a housing box for housing the electrical device, the housing box including an insertion port into which a portion of the protruding portion is inserted, a tubular first cover portion that protrudes outward from a circumferential edge portion of the insertion port and covers the protruding portion, and a second cover portion that protrudes from a portion of a front end face of the first cover portion and covers the protruding portion or the tubular portion with a space interposed between the second cover portion and the protruding portion or the tubular portion; and an adhering member that is provided between the protruding portion of the connector and the first cover portion of the housing box and adheres to the protruding portion and the first cover portion.

According to the aspect described above, water is unlikely to accumulate in the space between the connector and the housing box.

DETAILED DESCRIPTION OF PREFERRED EMBODIMENTS

Figure 1:
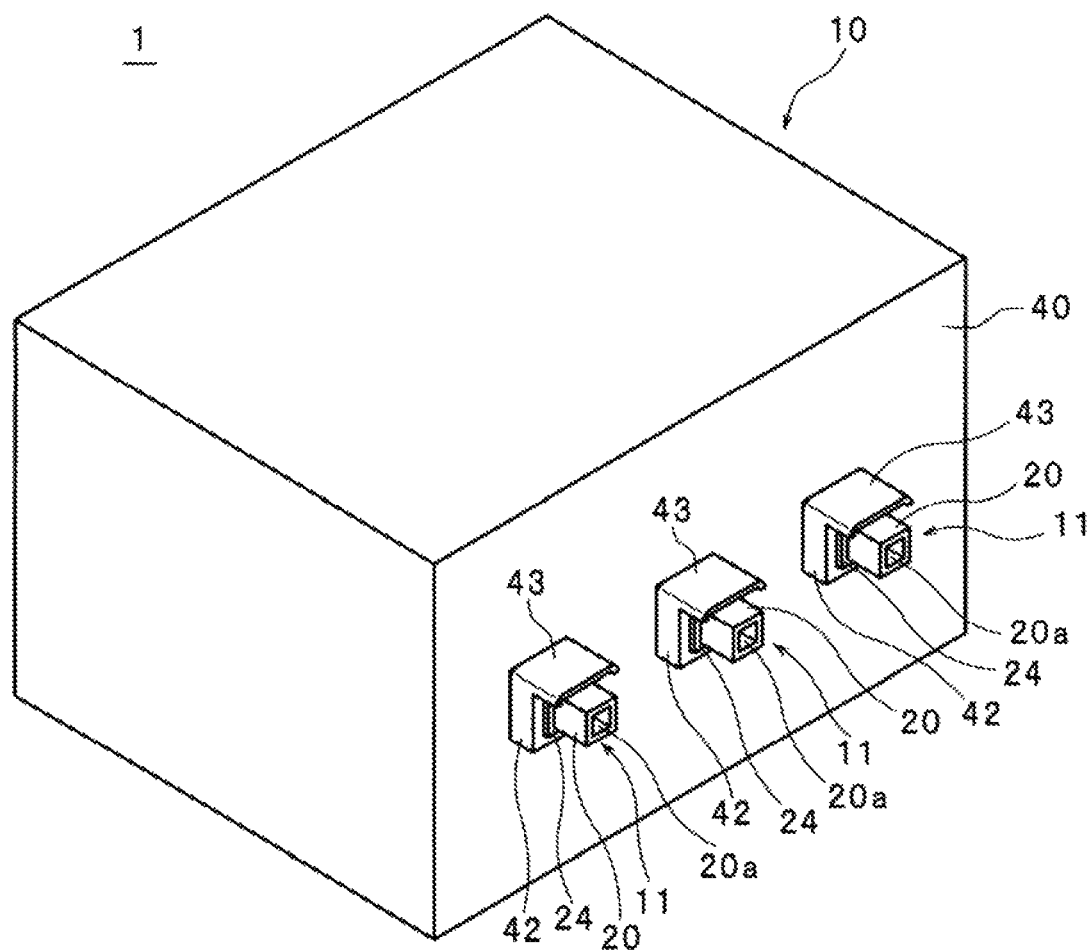
FIG. 1 is a perspective view of an electrical junction box according to Embodiment 1.

First, aspects according to the present disclosure are listed and described. Portions of the embodiments described below may be combined in any way.

An electrical junction box according to one aspect of the present disclosure is an electrical junction box in which an electrical device is housed and that connects a plurality of external devices to each other via the electrical device housed therein, the electrical junction box including: a connector that includes a tubular portion whose one end face is open, and a protruding portion that protrudes from a bottom wall of the tubular portion away from the tubular portion; a housing box that houses the electrical device, the housing box including an insertion port into which a portion of the protruding portion is inserted, a tubular first cover portion that protrudes outward from a circumferential edge portion of the insertion port and covers the protruding portion, and a second cover portion that protrudes from a portion of a front end face of the first cover portion and covers the protruding portion or the tubular portion with a space interposed between the second cover portion and the protruding portion or the tubular portion; and an adhering member that is provided between the protruding portion of the connector and the first cover portion of the housing box and adheres to the protruding portion and the first cover portion.

In the aspect described above, it is assumed that the apparatus is installed such that the second cover portion is positioned on the upper side of the connector. In this case, the second cover portion protruding from the first cover portion covers the upper side of the protruding portion of the connector or the tubular portion with a space interposed therebetween. Accordingly, water is unlikely to enter the space between the first cover portion of the housing box and the protruding portion of the connector from the upper surface of the second cover portion, and thus water is unlikely to accumulate in the space between the connector and the housing box.

In the electrical junction box according to one aspect of the present disclosure, the connector includes a second protruding portion that protrudes from a side face of the protruding portion or the tubular portion, a side face of the second protruding portion opposes the front end face of the first cover portion of the housing box, and the second cover portion covers a front end face of the second protruding portion.

According to the aspect described above, a second protruding portion is provided, and the second cover portion covers the front end face of the second protruding portion. Accordingly, when the apparatus is installed such that the second cover portion is positioned on the upper side of the connector, water is unlikely to enter the space between the first cover portion of the housing box and the protruding portion of the connector from the upper face of the second cover portion and the tubular portion.

In the electrical junction box according to one aspect of the present disclosure, two side portions of the second cover portion are curved in opposition the connector.

According to the aspect described above, two side portions of the second cover portion are curved in opposition to the connector. Accordingly, water is unlikely to enter the space between the first cover portion of the housing box and the protruding portion of the connector from the two side portions of the second cover portion.

In the electrical junction box according to one aspect of the present disclosure, the adhering member includes: a plurality of adhering portions that adhere to the protruding portion and the first cover portion; and a non-adhering portion that is connected to two adhering portions out of the plurality of adhering portions, and is separated from the protruding portion and the first cover portion.

According to the aspect described above, the adhering member adheres to the housing box and the connector at a plurality of portions, as a result of which water is more reliably prevented from entering the housing box.

Specific examples of the electrical junction boxes according to embodiments of the present disclosure will be described below with reference to the drawings. Note that the present invention is not limited to the examples given below, the scope of the present invention is indicated by the appended claims, and all changes that come within the meaning and range of equivalency of the claims are intended to be embraced within the scope of the present invention.

Embodiment 1

FIG. 1 is a perspective view of an electrical junction box 1 according to Embodiment 1. The electrical junction box 1 includes a hollow rectangular parallelepiped housing box 10. A plurality of connectors 11, 11 . . . and 11 are provided on the right side surface of the housing box 10. The plurality of connectors 11, 11 . . . and 11 are arranged side by side in the front-back direction. FIG. 1 shows an example in which three connectors 11 are provided.

Figure 2:
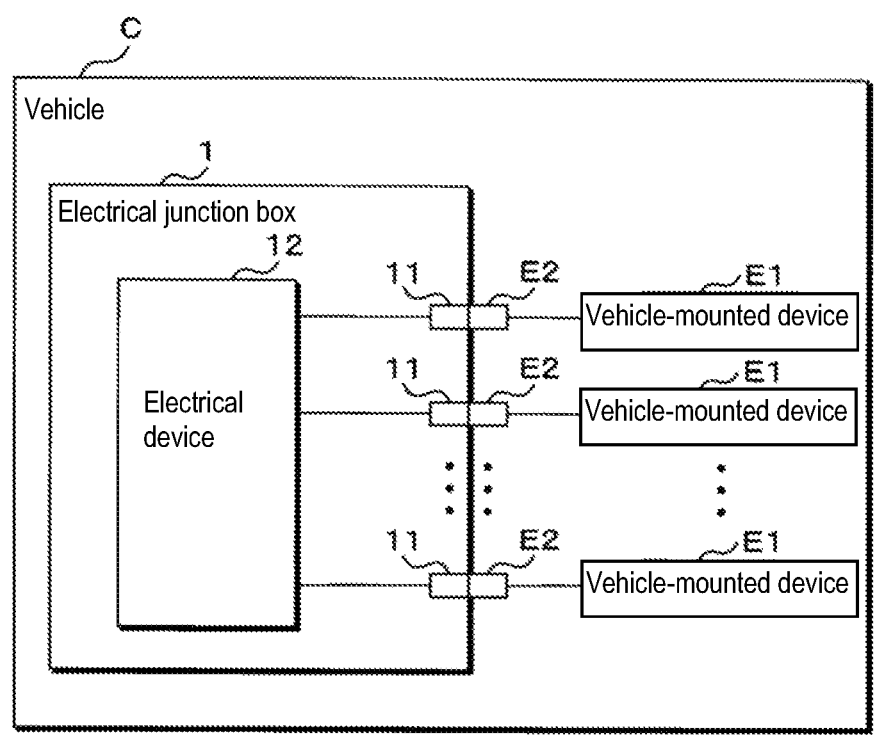
FIG. 2 is a block diagram illustrating the operations of the electrical junction box.

FIG. 2 is a block diagram illustrating the operations of the electrical junction box 1. The electrical junction box 1 is mounted on a vehicle C. In the electrical junction box 1, an electrical device 12 is housed in the housing box 10, which is made of aluminum. The electrical device 12 is connected to each of the plurality of connectors 11, 11 . . . and 11. A connector E2 is connected to each vehicle-mounted device E1. The connectors E2 are attached to the connectors 11. When a connector E2 is attached to a connector 11, the electrical device 12 is connected to the corresponding vehicle-mounted device E1.

When a plurality of connectors E2, E2 . . . and E2 are attached respectively to the plurality of connectors 11, 11 . . . and 11, each of a plurality of vehicle-mounted devices E1, E1 . . . and E1 is connected to at least one of the other vehicle-mounted devices E1, E1 . . . and E1 via the electrical device 12.

As described above, in the electrical junction box 1, the electrical device 12 is housed in the housing box 10, and a plurality of vehicle-mounted devices E1, E1 . . . and E1 are connected to each other via the electrical device 12 housed in the housing box 10. The vehicle-mounted devices E1 function as external devices.

The vehicle-mounted devices E1 may be batteries, lamps, motors, or the like. It is assumed here that one of the plurality of vehicle-mounted devices E1, E1 . . . and E1 is a battery, and the remaining vehicle-mounted devices E1, E1 . . . and E1 are lamps or motors. As a first example, the electrical device 12 includes a plurality of fuses, and the battery is connected to the remaining vehicle-mounted devices E1, E1 . . . and E1 via the plurality of fuses. The electrical device 12 protects the remaining vehicle-mounted devices E1, E1 . . . and E1 from over-current.

As a second example, the electrical device 12 is a DCDC converter that transforms DC voltage. In this case, the electrical device 12 transforms the output voltage of the battery, and outputs the transformed voltage to the remaining vehicle-mounted devices E1, E1 . . . and E1. As a third example, the electrical device 12 includes a plurality of switches, and the battery is connected to the remaining vehicle-mounted devices E1, E1 . . . and E1 via the plurality of switches. By switching the plurality of switches between on and off, the vehicle-mounted devices E1 to which power is supplied from the battery are changed.

Figure 3:
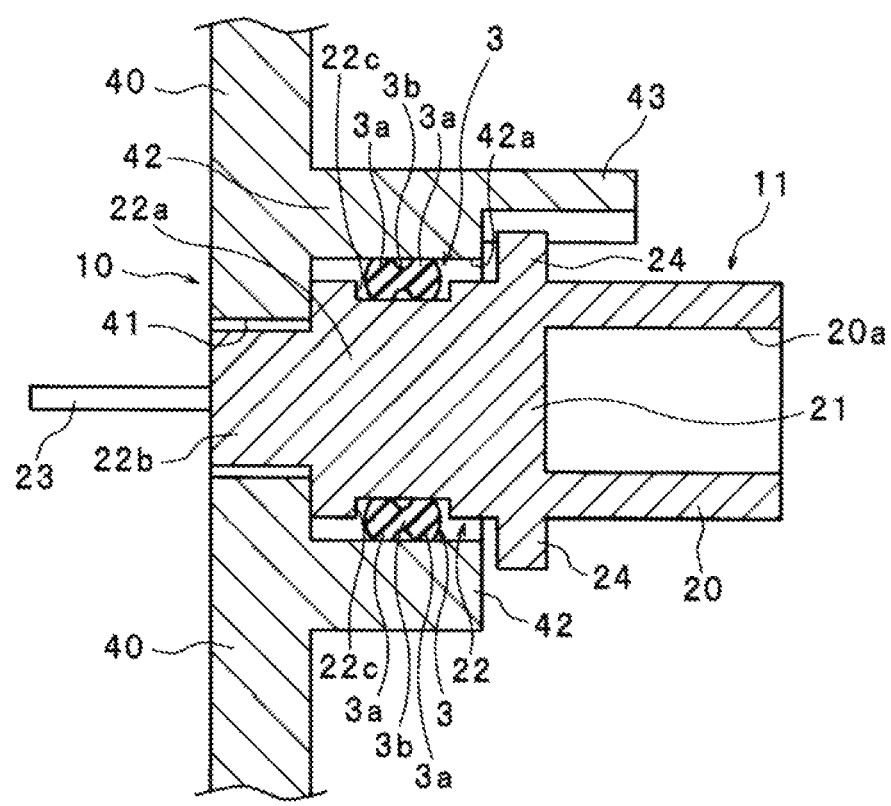
FIG. 3 is a partial cross-sectional view of the electrical junction box.
Figure 4:
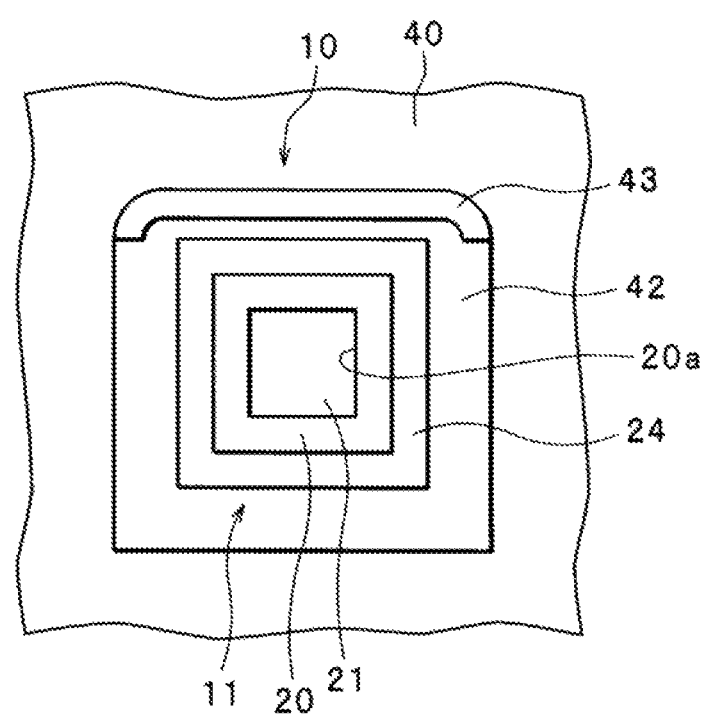
FIG. 4 is a front view of a connector.

FIG. 3 is a partial cross-sectional view of the electrical junction box 1. FIG. 4 is a front view of a connector 11. As shown in FIGS. 3 and 4, a connector 11 includes a tubular portion 20 that has a hollow rectangular parallelepiped shape whose one end face is open. The front end face of the tubular portion 20 has a rectangular frame shape. The tubular portion 20 has a rectangular opening 20a. From a bottom wall 21 of the tubular portion 20, a pillar-shaped protruding portion 22 protrudes toward the outside of the tubular portion 20, or in other words, to the left side in the axial direction of the axial direction of the tubular portion 20. In the connector 11, the tubular portion 20 is provided on the right side, and the protruding portion 22 is provided on the left side.

In the protruding portion 22, a first pillar-shaped portion 22a protrudes from the bottom wall 21 of the tubular portion 20 toward the outside of the tubular portion 20, or in other words, to the left side in the axial direction of the tubular portion 20. Furthermore, from a portion of the front end face of the first pillar-shaped portion 22a, a second pillar-shaped portion 22b protrudes to the left side in the axial direction of the tubular portion 20. The protruding direction of the second pillar-shaped portion 22b is the same as the protruding direction of the first pillar-shaped portion 22a. A lead wire 23 protrudes from the front end face of the second pillar-shaped portion 22b.

A connector E2 that is connected to a vehicle-mounted device E1 is inserted into the opening 20a of the connector 11. As a result, the connector E2 is attached to the connector 11. When the connector E2 is attached to the connector 11, the lead wire 23 is connected to the vehicle-mounted device E1. The lead wire 23 is connected to the electrical device 12. The electrical device 12 is connected to the vehicle-mounted device E1 via the lead wire 23, the connector 11 and the connector E2.

In the electrical junction box 1, a recess portion 22c that is recessed in the first pillar-shaped portion 22a is formed in the side face of the first pillar-shaped portion 22a of the protruding portion 22. An adhering member (sealing member) 3 that adheres to the housing box 10 and the connector 11 is disposed in the recess portion 22c. The adhering member 3 is a water-repellent elastic member that is made of rubber.

Figure 5:
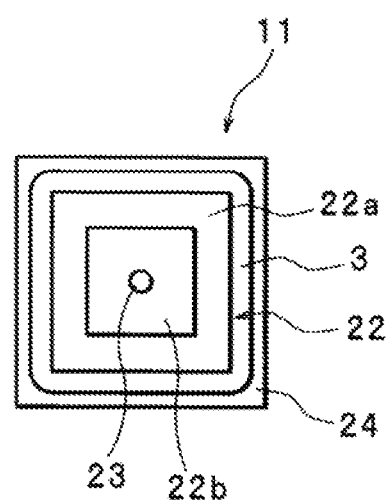
FIG. 5 is a diagram illustrating the arrangement of a connector and an adhering member.

FIG. 5 is a diagram illustrating the arrangement of the connector 11 and the adhering member 3. FIG. 5 shows an external view of the connector 11, which is detached from the housing box 10, and the adhering member 3. As shown in FIG. 5, the front end face of the first pillar-shaped portion 22a has a rectangular shape, and the second pillar-shaped portion 22b protrudes from the center of the front end face of the first pillar-shaped portion 22a. The front end face of the second pillar-shaped portion 22b also has a rectangular shape, and the lead wire 23 protrudes from the center of the front end face of the second pillar-shaped portion 22b.

In the first pillar-shaped portion 22a of the protruding portion 22, the recess portion 22c extends along the circumferential direction of the first pillar-shaped portion 22a. The adhering member 3 has an annular shape, and surrounds the first pillar-shaped portion 22a.

Also, in the connector 11, a second protruding portion 24 protrudes from the side face of the first pillar-shaped portion 22a at a position closer to the tubular portion 20 than to the recess portion 22c, or in other words, on the right side of the recess portion 22c. As shown in FIG. 5, the second protruding portion 24 extends along the circumferential direction of the first pillar-shaped portion 22a.

Figure 6:
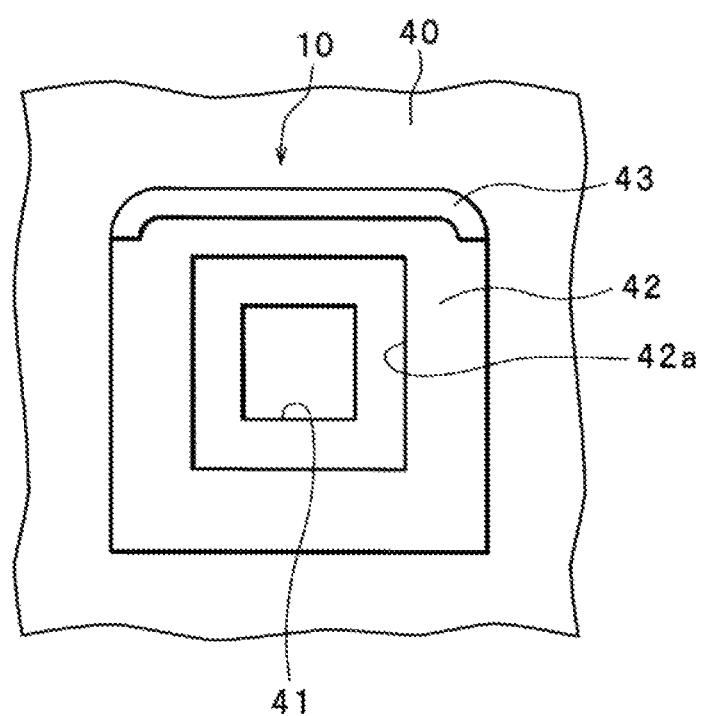
FIG. 6 is an external view showing a portion of a housing box.

FIG. 6 is an external view showing a portion of the housing box 10. FIG. 6 shows the outer appearance of the housing box 10 from which the connector 11 and the adhering member 3 are detached. As shown in FIGS. 3 and 6, in a side wall 40 of the housing box 10, a rectangular insertion port 41 is formed into which the second pillar-shaped portion 22b of the protruding portion 22 of the connector 11 is inserted. The end face of the first pillar-shaped portion 22a of the protruding portion 22 is in contact with the circumferential edge portion of the insertion port 41 of the side wall 40.

A tubular first cover portion 42 protrudes from the circumferential edge portion of the insertion port 41 of the side wall 40 toward the outside of the housing box 10, or in other words, to the right side. As shown in FIG. 6, the front end face of the first cover portion 42 has a rectangular frame shape. The first cover portion 42 includes a rectangular opening 42a. As shown in FIG. 3, the first pillar-shaped portion 22a of the protruding portion 22 of the connector 11 and the adhering member 3 are provided on the inner side of the first cover portion 42, and the first cover portion 42 covers the side face of the first pillar-shaped portion 22a and the adhering member 3. The front end face of the first cover portion 42 opposes the side face of the second protruding portion 24.

The adhering member 3 is provided between the first pillar-shaped portion 22a of the protruding portion 22 and the first cover portion 42, and adheres to the first pillar-shaped portion 22a and the first cover portion 42. In the adhering member 3, two annular adhering portions 3a and 3a that adhere to the first pillar-shaped portion 22a and the first cover portion 42 are provided side by side in the axial direction of the first pillar-shaped portion 22a. The two adhering portions 3a and 3a are connected by a non-adhering portion 3b that is separated from the first pillar-shaped portion 22a and the first cover portion 42.

The adhering portions 3a are deformed by a pressure applied by the first pillar-shaped portion 22a and the first cover portion 42. The adhering portions 3a are slimmer when the adhering member 3 is provided between the first pillar-shaped portion 22a and the first cover portion 42 than when the adhering member 3 is detached. Because the adhering member 3 adheres to the first pillar-shaped portion 22a and the first cover portion 42, the insertion port 41 is hermetically sealed, and thus water is prevented from entering the housing box 10 from the insertion port 41.

The adhering member 3 adheres to the first cover portion 42 of the housing box 10 and the first pillar-shaped portion 22a of the connector 11 at a plurality of portions. Accordingly, water is more reliably prevented from entering the housing box 10. If water enters the housing box 10 and comes into contact with the electrical device 12, the electrical device 12 may be damaged.

Also, because the recess portion 22c is provided, the possibility that the adhering member 3 moves to an unintended position when the connector 11 in which the adhering member 3 is provided on the first pillar-shaped portion 22a of the protruding portion 22 is attached to the housing box 10 is low.

A plate-like second cover portion 43 protrudes from a portion of the front end face of the first cover portion 42. The electrical junction box 1 is installed such that the second cover portion 43 is positioned on the upper side of the connector 11. The second cover portion 43 extends along the upper side of the outer edge of the front end face of the first cover portion 42, and the upper face of the first cover portion 42 and the upper face of the second cover portion 43 are continuous. The second cover portion 43 partially covers the tubular portion 20 and the first pillar-shaped portion 22a of the protruding portion 22 with a space interposed therebetween, and also covers the front end face of the second protruding portion 24 with a space interposed therebetween. As shown in FIG. 6, two side portions of the second cover portion 43 extending along the outer edge of the front end face of the first cover portion 42, or in other words, a front side portion and a rear side portion of the second cover portion 43 are curved downward. The two side portions of the second cover portion 43 oppose the connector 11.

As described above, the housing box 10 is made of aluminum. In the housing box 10, a treatment called anodization is performed on the outer face of the side wall 40, the outer face of the first cover portion 42, the upper face of the second cover portion 43, and the like. Anodization is a treatment for forming an anodized coating on an aluminum surface. By forming a thick aluminum oxide coating on its surface, the corrosion resistance and wear resistance of aluminum are improved.

In the electrical junction box 1, the second cover portion 43 covers the tubular portion 20 of the connector 11 and the first pillar-shaped portion 22a of the protruding portion 22 of the connector 11 with a space interposed therebetween. With this configuration, water is unlikely to enter the space between the first pillar-shaped portion 22a and the first cover portion 42 from the upper face of the second cover portion 43, and thus water is unlikely to accumulate in the space between the first pillar-shaped portion 22a and the first cover portion 42. Accordingly, the possibility that saltwater accumulates in a space surrounded by the first pillar-shaped portion 22a, the first cover portion 42 and the adhering member 3, and the inner face of the first cover portion 42 is corroded is low. Because the possibility that the inner face of the first cover portion 42 is corroded is low, it is unnecessary to perform anodization on the inner face of the first cover portion 42.

Furthermore, the second cover portion 43 covers the front end face of the second protruding portion 24 with a space interposed therebetween. Accordingly, water is unlikely to enter the space between the first pillar-shaped portion 22a and the first cover portion 42 from the upper face of the tubular portion 20 and the second cover portion 43.

The upper face of the tubular portion 20 may be inclined in the right downward direction. In this case, the possibility that water that has flowed through the upper surface of the tubular portion 20 and the second cover portion 43 enters the space between the first pillar-shaped portion 22a and the first cover portion 42 is further reduced.

Also, two side portions of the second cover portion 43 extending along the outer edge of the front end face of the first cover portion 42 are curved downward to oppose the connector 11. Accordingly, water is unlikely to enter the space between the first cover portion 42 of the housing box 10 and the first pillar-shaped portion 22a of the protruding portion 22 of the connector 11 from the two side portions of the second cover portion 43.

Embodiment 2

Figure 7:
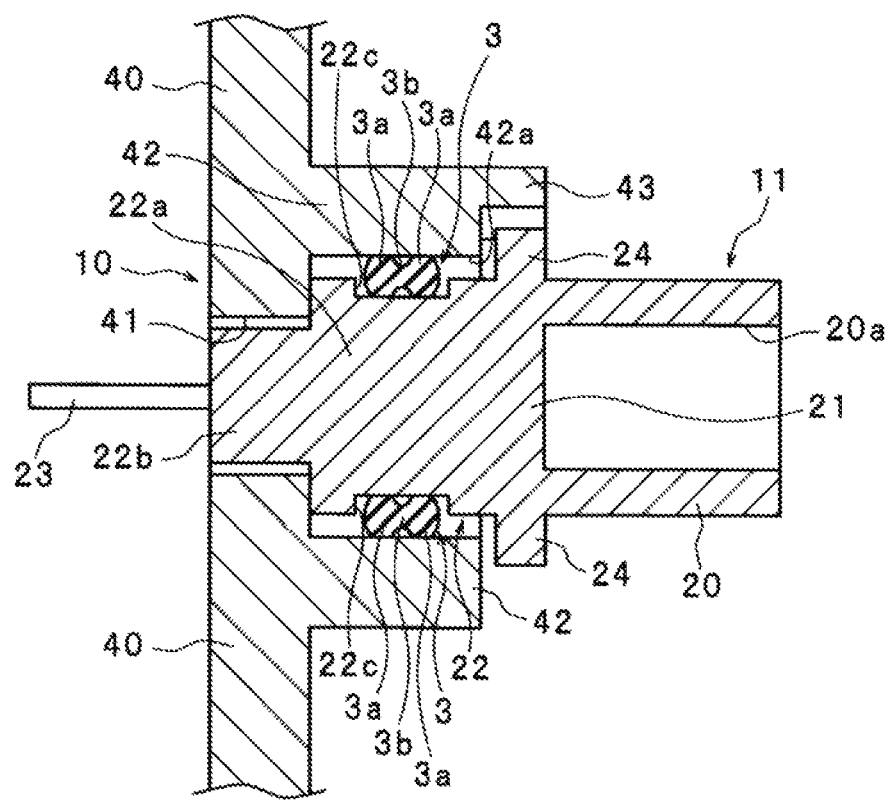
FIG. 7 is a partial cross-sectional view of an electrical junction box according to Embodiment 2.

FIG. 7 is a partial cross-sectional view of an electrical junction box 1 according to Embodiment 2.

Hereinafter, Embodiment 2 will be described focusing on a difference from Embodiment 1. Constituent elements other than that described below are the same as those of Embodiment 1. Accordingly, the constituent elements that are the same as those of Embodiment 1 are given the same reference numerals, and a description thereof is omitted here.

FIG. 7 corresponds to FIG. 3. In the electrical junction box 1 according to Embodiment 2, the second cover portion 43 covers the upper face of the first pillar-shaped portion 22a of the protruding portion 22 of the connector 11 and the second protruding portion 24 with a space interposed therebetween, without covering the tubular portion 20 of the connector 11.

The electrical junction box 1 according to Embodiment 2 configured as described above provides the same effects as the electrical junction box 1 according to Embodiment 1.

Embodiment 3

Figure 8:
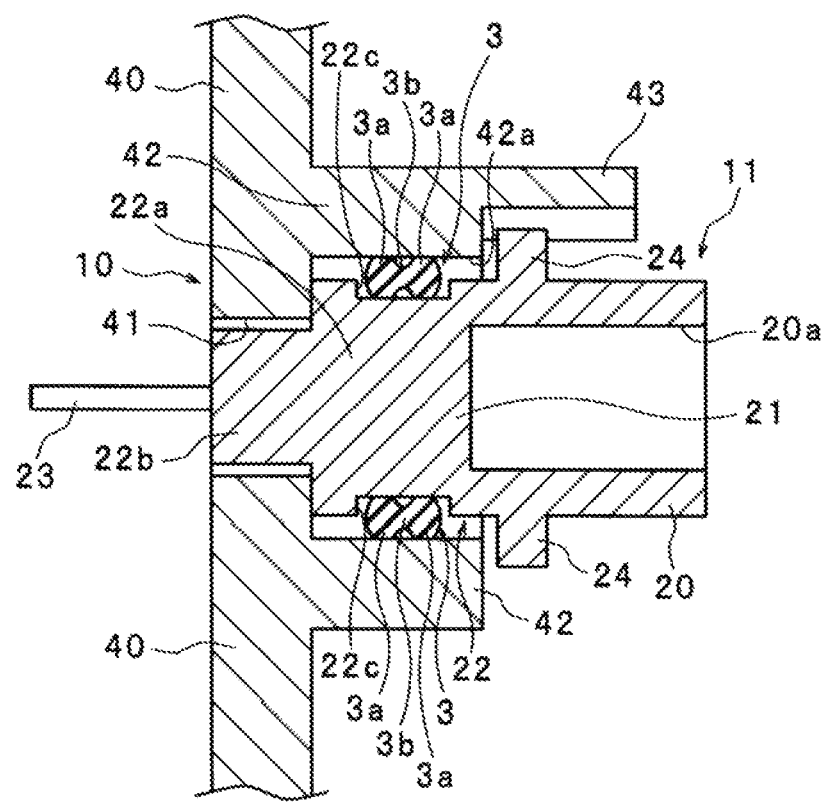
FIG. 8 is a partial cross-sectional view of an electrical junction box according to Embodiment 3.

FIG. 8 is a partial cross-sectional view of an electrical junction box 1 according to Embodiment 3. Hereinafter, Embodiment 3 will be described focusing on a difference from Embodiment 1. Constituent elements other than that described below are the same as those of Embodiment 1. Accordingly, the constituent elements that are the same as those of Embodiment 1 are given the same reference numerals, and a description thereof is omitted here.

FIG. 8 corresponds to FIG. 3. In the electrical junction box 1 according to Embodiment 3, the second protruding portion 24 protrudes from the outer side face of the tubular portion 20 of the connector 11. The second protruding portion 24 extends along the circumferential direction of the tubular portion 20. As in Embodiment 1, the side face of the second protruding portion 24 opposes the front end face of the first cover portion 42.

Also, the second cover portion 43 covers the tubular portion 20 of connector 11 and the upper face of the second protruding portion 24 with a space interposed therebetween, without covering the protruding portion 22 of the connector 11.

The electrical junction box 1 according to Embodiment 3 configured as described above provides the same effects as the electrical junction box 1 according to Embodiment 1.

In Embodiment 3, the second cover portion 43 may be configured as in Embodiment 2 such that the second cover portion 43 covers the upper face of the second protruding portion 24, but does not cover the tubular portion 20 that is positioned on the right side of the second protruding portion 24.

Also, in Embodiments 1 to 3, the position at which the second cover portion 43 is provided is not limited to the upper side portion of the outer edge of the front end face of the first cover portion 42. The second cover portion 43 may, for example, extend along the entire outer edge of the front end face of the first cover portion 42. Furthermore, the housing box 10 is not necessarily made of aluminum as long as it is made of a metal. Also, the number of adhering portions 3a in the adhering member 3 is not limited to two, and may be three or more. In this case, three or more adhering portions 3a, 3a . . . and 3a are arranged side by side in the axial direction of the first pillar-shaped portion 22a, and two adjacent adhering portions 3a and 3a are connected by a non-adhering portion 3b. The number of non-adhering portions 3b is one less than the number of adhering portions 3a.

Furthermore, in Embodiments 1 to 3, the position at which the connector 11 is provided is not limited to the side wall 40 that is the right side wall of the housing box 10, and may also be any other portion. Also, not all of the plurality of connectors of the electrical junction box 1 need to be configured in the same manner as the connector 11. For example, in the case where a connector is provided on the upper face of the housing box 10 of the electrical junction box 1, this connector may have a configuration different from that of the connector 11. In this case, the portion of the upper face of the housing box 10 to which this connector is attached is configured differently from that of the portion of the housing box 10 to which the connector 11 is attached.

Embodiments 1 to 3 disclosed herein should be considered illustrative in all aspects and not restrictive. The scope of the present invention is indicated by the appended claims rather than the forgoing description, and all changes that come within the meaning and range of equivalency of the claims are intended to be embraced within the scope of the present invention.

What is claimed is:

1. An electrical junction box in which an electrical device can be housed and that can connect a plurality of external devices to each other via the electrical device housed therein, the electrical junction box comprising:
   a connector that includes a tubular portion whose one end face is open, and a protruding portion that protrudes from a bottom wall of the tubular portion away from the tubular portion;
   a housing box for housing the electrical device, the housing box including an insertion port into which a portion of the protruding portion is inserted, a tubular first cover portion that protrudes outward from a circumferential edge portion of the insertion port and covers the protruding portion, the first cover portion having a first thickness, and a second cover portion having a second thickness, the second thickness smaller than the first thickness, the second cover portion protruding from a portion of a front end face of the first cover portion and covers the protruding portion or the tubular portion with a space interposed between the second cover portion and the protruding portion or the tubular portion, wherein an outer surface of the first cover portion and an outer surface of the second cover portion are contiguous with each other and disposed along a common radius with respect to the insertion port; and an adhering member that is provided between the protruding portion of the connector and the first cover portion of the housing box and adheres to the protruding portion and to the first cover portion.

2. The electrical junction box according to claim 1,
wherein the connector includes a second protruding portion that protrudes from a side face of the protruding portion or the tubular portion, a side face of the second protruding portion opposes the front end face of the first cover portion of the housing box, and the second cover portion covers a front end face of the second protruding portion.

3. The electrical junction box according to claim 1, wherein two side portions of the second cover portion are curved in opposition to the connector.

4. The electrical junction box according to claim 1, wherein the adhering member includes:
   a plurality of adhering portions that adhere to the protruding portion and the first cover portion; and
   a non-adhering portion that is connected to two adhering portions out of the plurality of adhering portions, and is separated from the protruding portion and the first cover portion.

5. The electrical junction box according to claim 2, wherein two side portions of the second cover portion are curved in opposition to the connector.

6. The electrical junction box according to claim 2, wherein the adhering member includes:
   a plurality of adhering portions that adhere to the protruding portion and the first cover portion; and
   a non-adhering portion that is connected to two adhering portions out of the plurality of adhering portions, and is separated from the protruding portion and the first cover portion.

7. The electrical junction box according to claim 3, wherein the adhering member includes:
   a plurality of adhering portions that adhere to the protruding portion and the first cover portion; and
   a non-adhering portion that is connected to two adhering portions out of the plurality of adhering portions, and is separated from the protruding portion and the first cover portion.

* * * * *